US012215721B2

(12) United States Patent
Itoh et al.

(10) Patent No.: US 12,215,721 B2
(45) Date of Patent: Feb. 4, 2025

(54) ELECTROMAGNETIC VALVE MANIFOLD

(71) Applicant: CKD CORPORATION, Komaki (JP)

(72) Inventors: Shinji Itoh, Komaki (JP); Chenghua Xue, Komaki (JP)

(73) Assignee: CKD CORPORATION, Komaki (JP)

( * ) Notice: Subject to any disclaimer, the term of this patent is extended or adjusted under 35 U.S.C. 154(b) by 195 days.

(21) Appl. No.: 18/156,724

(22) Filed: Jan. 19, 2023

(65) Prior Publication Data

US 2023/0235758 A1 Jul. 27, 2023

(30) Foreign Application Priority Data

Jan. 25, 2022 (JP) ................................ 2022-009060

(51) Int. Cl.
*F15B 13/08* (2006.01)

(52) U.S. Cl.
CPC ...... *F15B 13/0821* (2013.01); *F15B 13/0828* (2013.01)

(58) Field of Classification Search
CPC .............. F15B 13/0821; F15B 13/0817; F15B 13/0402; F15B 13/0417; F15B 13/025; F15B 13/026
See application file for complete search history.

(56) References Cited

U.S. PATENT DOCUMENTS 6,405,815 B1 * 6/2002 Stoever .................. B60K 25/00 137/614.04
2023/0106896 A1 * 4/2023 Okamoto ............ F16K 11/0704 137/383

FOREIGN PATENT DOCUMENTS

JP H058622 2/1993
JP H058622 U 2/1993

* cited by examiner

*Primary Examiner* — Kenneth Rinehart
*Assistant Examiner* — Nicole Gardner
(74) *Attorney, Agent, or Firm* — Tarolli, Sundheim, Covell & Tummino LLP

(57) ABSTRACT

An electromagnetic valve manifold includes spacers and pressure reducing valves. Each spacer includes an attachment surface to which a body of the pressure reducing valve is attached. The body includes a first surface, a second surface, and a connecting surface, which connects the first and second surfaces to each other. A pressure gauge is provided on the connecting surface. The width of the body is smaller than the size of the pressure gauge in the width direction of the body. The bodies include one or more first bodies and one or more second bodies. The first surface of each first body is attached to the attachment surface. The second surface of each second body is attached to the attachment surface of one of the spacers different from the spacer to which the first body is attached. The first bodies and the second bodies are arranged alternately in the arrangement direction.

3 Claims, 4 Drawing Sheets

ELECTROMAGNETIC VALVE MANIFOLD

RELATED APPLICATIONS

The present invention is a U.S. Nonprovisional Application, claiming priority to Japanese Patent Application No. 2022-009060, filed on Jan. 25, 2022; the entirety of which is hereby incorporated herein by reference.

BACKGROUND

1. Field

The present disclosure relates to an electromagnetic valve manifold.

2. Description of Related Art

An electromagnetic valve manifold includes electromagnetic valves, manifold bases, and spacers in some cases. Each electromagnetic valve includes a supply port. Each manifold base includes a supply passage. The supply passage supplies pressure fluid to the corresponding supply port. Each spacer is disposed between the corresponding manifold base and the corresponding electromagnetic valve. Some electromagnetic valve manifolds include pressure reducing valves, for example, as disclosed in Japanese Laid-Open Utility Model Publication No. H05-8622. A pressure reducing valve reduces the pressure of pressure fluid that flows out from an electromagnetic valve to a preset pressure. The pressure reducing valve includes a body that has, for example, the shape of an elongated rectangular block. The body is attached to a spacer.

Such an electromagnetic valve manifold may be configured such that the electromagnetic valves are arranged side by side, and the manifold bases, the spacers, and the bodies are arranged in the arrangement direction of the electromagnetic valves so as to correspond to the electromagnetic valves. In this case, the width direction of each body agrees with the arrangement direction of the electromagnetic valves.

Each spacer includes an attachment surface to which the body is attached. Each spacer includes a first supply connecting passage and a second supply connecting passage. A first end of the first supply connecting passage is connected to the supply passage. A second end of the first supply connecting passage opens in the attachment surface. A first end of the second supply connecting passage is connected to the supply port. A second end of the second supply connecting passage opens in the attachment surface.

The body includes a primary-side passage and a secondary-side passage. The primary-side passage is connected to the first supply connecting passage. The secondary-side passage is connected to the second supply connecting passage. Further, the body includes a first surface, a second surface, and a connecting surface. The first surface is located at a first end in the longitudinal direction of the body. The second surface is located at a second end in the longitudinal direction of the body. The connecting surface is a surface of the body that connects the first surface and the second surface to each other and extends in the longitudinal direction and the width direction of the body.

A pressure gauge is provided on the connecting surface. The pressure gauge detects the pressure in the secondary-side passage. The pressure reducing valve reduces the pressure in the secondary-side passage such that the pressure detected by the pressure gauge becomes a preset pressure. Thus, the pressure of the pressure fluid that flows out from the electromagnetic valve is reduced.

For example, in order to reduce the size of an electromagnetic valve manifold, the width of each electromagnetic valve is reduced as much as possible in some cases. In such a case, the widths of the manifold base, the spacer, and the body are reduced, like the width of the electromagnetic valve. At this time, it is necessary to prevent the pressure gauges adjacent to each other in the arrangement direction of the electromagnetic valves from interfering with each other. It is also necessary to maintain the size of the pressure gauges so as not to degrade the visibility of the pressure gauges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve manifold includes electromagnetic valves, manifold bases, spacers, and pressure reducing valves. The electromagnetic valves are arranged side by side in one direction. Each electromagnetic valve includes a supply port. The manifold bases each include a supply passage. The supply passage is configured to supply a pressure fluid to the supply port. Each spacer is displaced between one of the manifold bases and one of the electromagnetic valves. The pressure reducing valves each include a body that has a shape of an elongated rectangular block. Each pressure reducing valve is configured to reduce a pressure of the pressure fluid that flows out from one of the electromagnetic valves. The manifold bases, the spacers, and the bodies are arranged side by side in an arrangement direction of the electromagnetic valves in correspondence with the electromagnetic valves. A width direction of each body agrees with the arrangement direction of the electromagnetic valves. Each spacer includes an attachment surface to which the body is attached, a first supply connecting passage that includes a first end connected to the supply passage and a second end that opens in the attachment surface, and a second supply connecting passage that includes a first end connected to the supply port and a second end that opens in the attachment surface. Each body includes a primary-side passage that is connected to the first supply connecting passage, a secondary-side passage that is connected to the second supply connecting passage, a first surface that is located at a first end in a longitudinal direction of the body, a second surface that is located at a second end in the longitudinal direction of the body, and a connecting surface that connects the first surface and the second surface to each other, and extends in the longitudinal direction and the width direction. A pressure gauge is provided on the connecting surface. The pressure gauge is configured to detect a pressure in the secondary-side passage. A width of the body is smaller than a size in the width direction of the pressure gauge. The pressure reducing valve is configured to reduce the pressure of the pressure fluid that flows out from the electromagnetic valve by reducing the pressure in the secondary-side passage such that the pressure detected by the pressure gauge becomes the preset pressure. Each of the primary-side passage and the secondary-side passage extends in the longitudinal direction through the body, and includes a first opening and a second opening that respectively open in the first surface and the second surface. The pressure gauge protrudes from the connecting surface in a state of being offset toward the first surface with respect to a center in the longitudinal direction of the connecting surface. The bodies include one or more first bodies and one or more second bodies. The first surface of each first body is attached to the attachment surface. The second surface of each second body is attached to the attachment surface of one of the spacers different from the spacer to which the first body is attached. The first bodies and the second bodies are arranged alternately in the arrangement direction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic valve manifold 10 according to one embodiment will now be described with reference to FIGS. 1 to 7.

<Overall Configuration of Electromagnetic Valve Manifold 10>

Figure 1:
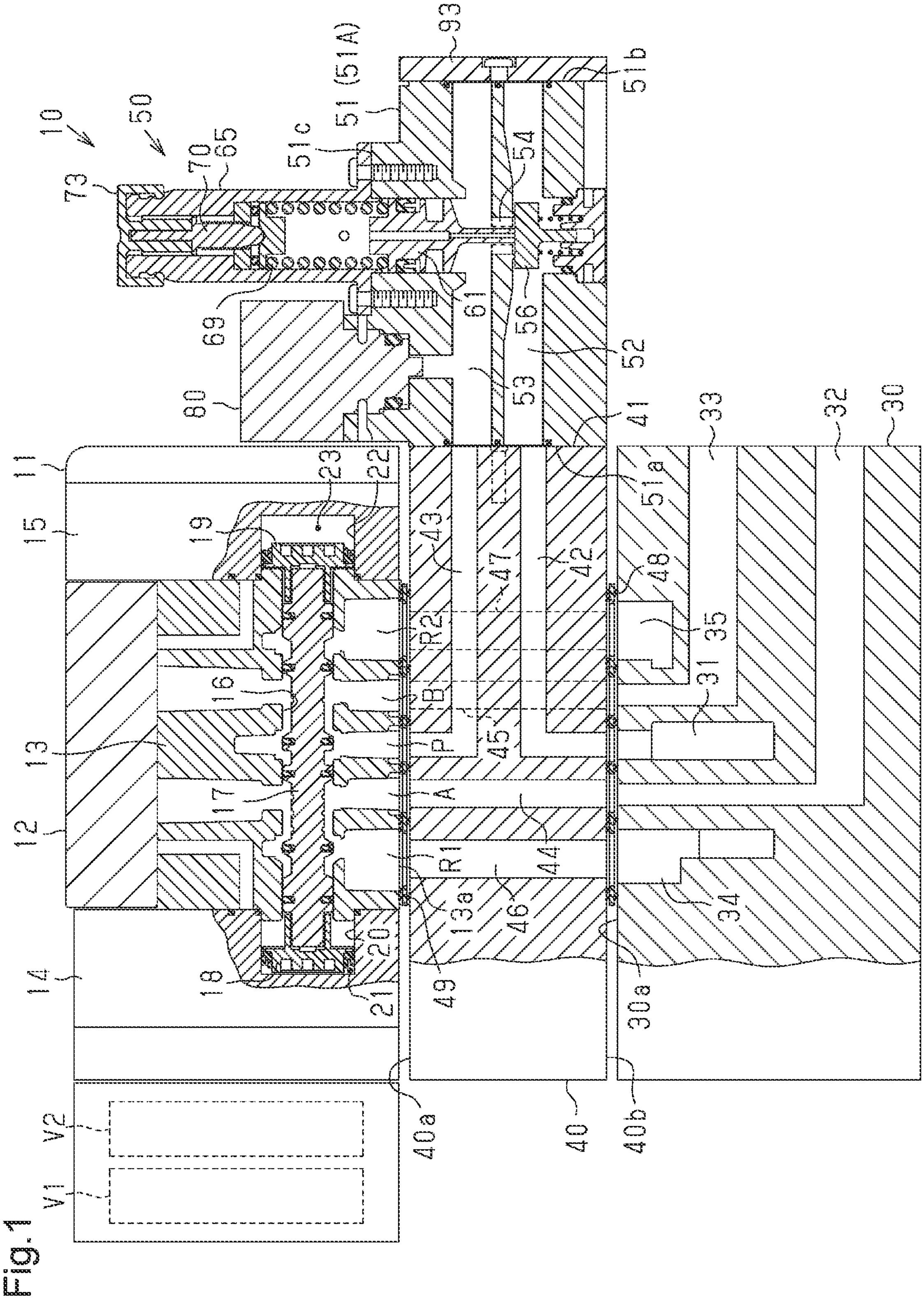
FIG. 1 is a cross-sectional view of an electromagnetic valve manifold according to one embodiment.
Figure 2:
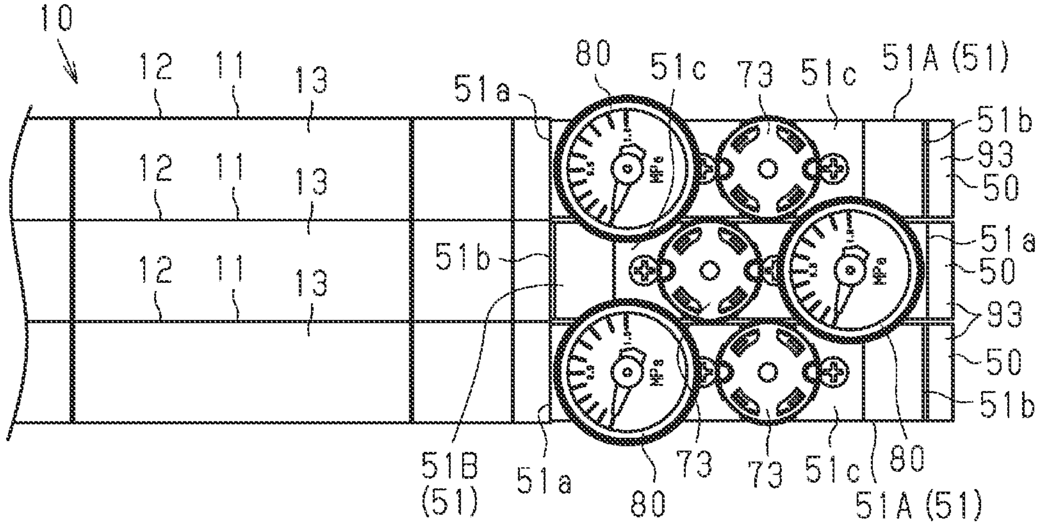
FIG. 2 is a plan view of the electromagnetic valve manifold shown in FIG. 1.

As shown in FIGS. 1 and 2, the electromagnetic valve manifold 10 includes electromagnetic valves 11, manifold bases 30, spacers 40, and pressure reducing valves 50. The electromagnetic valves 11 are arranged side by side in one direction. The spacers 40 are each disposed between the corresponding manifold base 30 and the corresponding electromagnetic valve 11. The manifold bases 30, the spacers 40, and the pressure reducing valves 50 are arranged side by side in the arrangement direction of the electromagnetic valves 11 in correspondence with the electromagnetic valves 11. Accordingly, the respective arrangement directions of the manifold bases 30, the spacers 40, and the pressure reducing valves 50 agree with the arrangement direction of the electromagnetic valves 11.

<Configuration of Electromagnetic Valve 11>

As shown in FIG. 1, each electromagnetic valve 11 includes a valve casing 12. The valve casing 12 has the shape of an elongated rectangular block. The valve casing 12 includes a casing body 13, a first coupling block 14, and a second coupling block 15. The casing body 13 has the shape of an elongated rectangular block. The first coupling block 14 is coupled to a first end in the longitudinal direction of the casing body 13. The second coupling block 15 is coupled to a second end in the longitudinal direction of the casing body 13. The casing body 13 includes a body facing surface 13*a*, which faces the spacer 40.

<Valve Hole 16>

The valve casing 12 includes a valve hole 16. The valve hole 16 is formed in the casing body 13. The valve hole 16 is a circular hole. The valve hole 16 extends in the longitudinal direction of the casing body 13. A first end of the valve hole 16 opens in a first end face in the longitudinal direction of the casing body 13. A second end of the valve hole 16 opens in a second end face in the longitudinal direction of the casing body 13. The valve hole 16 thus extends through the casing body 13 in the longitudinal direction.

<Spool Valve 17>

Each electromagnetic valve 11 includes a spool valve 17. The spool valve 17 is accommodated in the valve hole 16 with the axial direction of the spool valve 17 agreeing with the axial direction of the valve hole 16. The spool valve 17 reciprocates in the valve hole 16.

<Ports of Electromagnetic Valve 11>

Each electromagnetic valve 11 includes a supply port P, a first output port A, a second output port B, a first discharge port R1, and a second discharge port R2. The electromagnetic valve 11 of the present embodiment is thus a five-port electromagnetic valve. The supply port P, the first output port A, the second output port B, the first discharge port R1, and the second discharge port R2 are formed in the casing body 13. The supply port P, the first output port A, the second output port B, the first discharge port R1, and the second discharge port R2 are each connected to the valve hole 16.

The first discharge port R1, the first output port A, the supply port P, the second output port B, and the second discharge port R2 are arranged in that order from the first end to the second end in the longitudinal direction of the casing body 13. First ends of the supply port P, the first output port A, the second output port B, the first discharge port R1, and the second discharge port R2 are each connected to the valve hole 16. Second ends of the supply port P, the first output port A, the second output port B, the first discharge port R1, and the second discharge port R2 each open in the body facing surface 13*a* of the casing body 13.

<First Piston 18 and Second Piston 19>

Each electromagnetic valve 11 includes a first piston 18 and a second piston 19. The first piston 18 has the shape of a disc. The first piston 18 is coupled to a first end of the spool valve 17. The first piston 18 moves integrally with the spool valve 17. The second piston 19 has the shape of a disc. The second piston 19 is coupled to a second end of the spool valve 17. The second piston 19 moves integrally with the spool valve 17.

<First Pilot Pressure Chamber 21>

The first coupling block 14 includes a first piston accommodating recess 20, which is a circular hole. The first piston accommodating recess 20 accommodates the first piston 18, while allowing the first piston 18 to reciprocate. The first piston accommodating recess 20 and the first piston 18 define a first pilot pressure chamber 21. Pilot fluid is supplied to and discharged from the first pilot pressure chamber 21.

<Second Pilot Pressure Chamber 23>

The second coupling block 15 includes a second piston accommodating recess 22, which is a circular hole. The second piston accommodating recess 22 accommodates the second piston 19, while allowing the second piston 19 to reciprocate. The second piston accommodating recess 22 and the second piston 19 define a second pilot pressure chamber 23. Pilot fluid is supplied to and discharged from the second pilot pressure chamber 23.

<First Pilot Valve V1 and Second Pilot Valve V2>

Each electromagnetic valve 11 includes a first pilot valve V1 and a second pilot valve V2. The electromagnetic valve 11 is therefore a double-solenoid electromagnetic pilot valve. Application of voltage to the first pilot valve V1 and the second pilot valve V2 is performed, for example, by an external controller (not shown) such as a programmable logic controller (PLC).

<First Position and Second Position of Spool Valve 17>

The spool valve 17 is switchable between a first position and a second position. For example, there may be a case in which voltage is applied to the first pilot valve V1, and voltage is not applied to the second pilot valve V2. In this case, the first pilot valve V1 supplies compressed fluid, which is pilot fluid, from a fluid supply source (not shown) to the first pilot pressure chamber 21. The second pilot valve V2 discharges the pilot fluid in the second pilot pressure chamber 23 to the atmosphere. Accordingly, the spool valve 17 moves toward the second piston accommodating recess 22. As a result, the spool valve 17 is switched to the first position, in which the supply port P is connected to the first output port A, and the second output port B is connected to the second discharge port R2. Also, when the spool valve 17 is switched to the first position, the supply port P and the second output port B are disconnected from each other, and the first output port A and the first discharge port R1 are disconnected from each other.

There may be a case in which voltage is not applied to the first pilot valve V1, and voltage is applied to the second pilot valve V2. In this case, the second pilot valve V2 supplies compressed fluid, which is pilot fluid, from the fluid supply source to the second pilot pressure chamber 23. The first pilot valve V1 discharges the pilot fluid in the first pilot pressure chamber 21 to the atmosphere. Accordingly, the spool valve 17 moves toward the first piston accommodating recess 20. As a result, the spool valve 17 is switched to the second position, in which the supply port P is connected to the second output port B, and the first output port A is connected to the first discharge port R1. Also, when the spool valve 17 is switched to the second position, the supply port P and the first output port A are disconnected from each other, and the second output port B and the second discharge port R2 are disconnected from each other.

Thus, the first pilot valve V1 supplies pilot fluid to and discharges pilot fluid from the first pilot pressure chamber 21, and the second pilot valve V2 supplies pilot fluid to and discharges pilot fluid from the second pilot pressure chamber 23, so that the spool valve 17 reciprocates in the valve hole 16 between the first position and the second position. The connection state among the ports is switched as the spool valve 17 is switched between the first position and the second position. FIG. 1 shows a state in which the spool valve 17 is located at the second position.

<Configuration of Manifold Base 30>

Each manifold base 30 has the shape of an elongated rectangular block. Each manifold base 30 includes a mounting surface 30*a*. The electromagnetic valve 11 is mounted on the mounting surface 30*a* with the spacer 40 between them. The longitudinal direction of the manifold base 30 agrees with the longitudinal direction of the valve casing 12.

The manifold base 30 includes a supply passage 31, a first output passage 32, a second output passage 33, a first discharge passage 34, and a second discharge passage 35. The supply passage 31, the first output passage 32, the second output passage 33, the first discharge passage 34, and the second discharge passage 35 open in the mounting surface 30*a*.

The end of the supply passage 31 at a side opposite to the mounting surface 30*a* is connected to the fluid supply source (not shown) via piping and the like. The end of the first output passage 32 at a side opposite to the mounting surface 30*a* and the end of the second output passage 33 at a side opposite to the mounting surface 30*a* are connected to a fluid pressure device (not shown) via piping and the like. The end of the first discharge passage 34 at a side opposite to the mounting surface 30*a* and the end of the second discharge passage 35 at the side opposite to the mounting surface 30*a* are open to the atmosphere.

<Configuration of Spacer 40>

Each spacer 40 has the shape of an elongated rectangular block. Each spacer 40 includes a first facing surface 40*a*, which faces the valve casing 12, and a second facing surface 40*b*, which faces the manifold base 30. The longitudinal direction of each spacer 40 agrees with the longitudinal direction of the valve casing 12.

Each spacer 40 includes an attachment surface 41. The attachment surface 41 is an end face located at a first end in the longitudinal direction of the spacer 40. Each spacer 40 includes a first supply connecting passage 42, a second supply connecting passage 43, a first output connecting passage 44, a second output connecting passage 45, a first discharge connecting passage 46, and a second discharge connecting passage 47.

The first supply connecting passage 42 includes a first end, which is connected to the supply passage 31, and a second end, which opens in the attachment surface 41. The second supply connecting passage 43 includes a first end, which is connected to the supply port P, and a second end, which opens in the attachment surface 41. The opening position of the second supply connecting passage 43 in the attachment surface 41 is closer to the first facing surface 40*a* than the opening position of the first supply connecting passage 42 in the attachment surface 41.

The first output connecting passage 44 connects the first output passage 32 and the first output port A to each other. The second output connecting passage 45 connects the second output passage 33 and the second output port B to each other. The first discharge connecting passage 46 connects the first discharge passage 34 and the first discharge port R1 to each other. The second discharge connecting passage 47 connects the second discharge passage 35 and the second discharge port R2 to each other.

<First Seal Member 48 and Second Seal Member 49>

The electromagnetic valve manifold 10 includes a first seal member 48 and a second seal member 49. The first seal member 48 provides a seal between the spacers 40 and the manifold bases 30. The first seal member 48 is, for example, a thin plate-shaped gasket. The second seal member 49 provides a seal between the spacers 40 and the valve casing 12. The second seal member 49 is, for example, a thin plate-shaped gasket.

<Configuration of Pressure Reducing Valve 50>

Each pressure reducing valve 50 includes a body 51 that has the shape of an elongated rectangular block. Each body 51 is attached to the corresponding spacer 40. Specifically, each body 51 is attached to the attachment surface 41 of the corresponding spacer 40. As shown in FIG. 2, the manifold bases 30, the spacers 40, and the bodies 51 are arranged side by side in the arrangement direction of the electromagnetic valves 11 in correspondence with the electromagnetic valves 11. The width direction of each body 51 coincides with the arrangement direction of the electromagnetic valves 11. In FIG. 2, the width direction of each body 51 is indicated by arrow X1.

<First Surface 51*a*, Second Surface 51*b*, and Connecting Surface 51*c*>

As shown in FIG. 1, each body 51 includes a first surface 51*a*, a second surface 51*b*, and a connecting surface 51*c*. The first surface 51*a* is located at a first end in the longitudinal direction of the body 51. The second surface 51*b* is located at a second end in the longitudinal direction of the body 51. The connecting surface 51*c* connects the first surface 51*a* and the second surface 51*b* to each other and extends in the longitudinal direction and the width direction of the body 51.

<Primary-Side Passage 52 and Secondary-Side Passage 53>

Each body 51 includes a primary-side passage 52 and a secondary-side passage 53. The primary-side passage 52 and the secondary-side passage 53 each extend through the body 51 in the longitudinal direction. Each of the primary-side passage 52 and the secondary-side passage 53 has a first opening and a second opening that respectively open in the first surface 51*a* and the second surface 51*b*. The secondary-side passage 53 is located closer to the connecting surface 51*c* than the primary-side passage 52. The primary-side passage 52 is connected to the first supply connecting passage 42. The secondary-side passage 53 is connected to the second supply connecting passage 43.

<Pressure Reducing Valve Hole 54 and Valve Seat 55>

Figure 3:
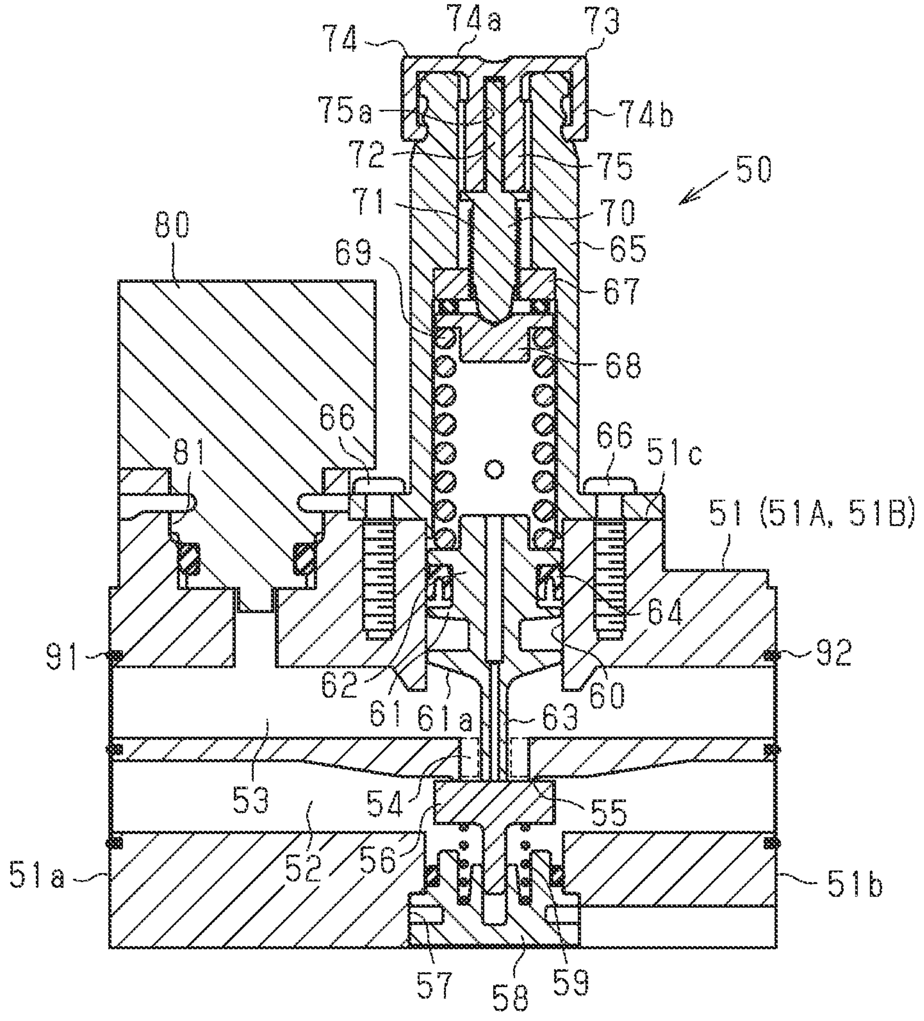
FIG. 3 is a cross-sectional view of a pressure reducing valve in the electromagnetic valve manifold shown in FIG. 1.

As shown in FIG. 3, each pressure reducing valve 50 includes a pressure reducing valve hole 54. The pressure reducing valve hole 54 is formed in the body 51. The pressure reducing valve hole 54 connects the primary-side passage 52 and the secondary-side passage 53 to each other. The body 51 includes a valve seat 55. The valve seat 55 is formed in the body 51 at a position surrounding the portion of the pressure reducing valve hole 54, which opens in the primary-side passage 52.

<Pressure Reducing Valve Member 56>

Each pressure reducing valve 50 includes a pressure reducing valve member 56. The pressure reducing valve member 56 selectively opens and closes the pressure reducing valve hole 54. The pressure reducing valve member 56 is located inside the primary-side passage 52. The pressure reducing valve member 56 reciprocates so as to come into contact with and separate from the valve seat 55. The pressure reducing valve member 56 is formed by lining a metal spring seat with rubber and integrating the spring seat with the rubber. The pressure reducing valve member 56 is accommodated in the body 51 via a hole 57 that opens to a surface of the body 51 on the side opposite to the connecting surface 51*c*. The hole 57 is sealed with a plug 58.

The pressure reducing valve member 56 is brought into a valve opening state by being separated from the valve seat 55. When in the valve opening state, the pressure reducing valve member 56 connects the primary-side passage 52 to the secondary-side passage 53 via the pressure reducing valve hole 54. On the other hand, the pressure reducing valve member 56 is brought into a valve closing state by being seated on the valve seat 55. When in the valve closing state, the pressure reducing valve member 56 blocks the connection between the primary-side passage 52 and the secondary-side passage 53 via the pressure reducing valve hole 54.

<Return Spring 59>

Each pressure reducing valve 50 includes a return spring 59. The return spring 59 is disposed between the pressure reducing valve member 56 and the plug 58. The return spring 59 urges the pressure reducing valve member 56 toward the valve seat 55. That is, the return spring 59 urges the pressure reducing valve member 56 in a direction in which the pressure reducing valve member 56 is brought into the valve closing state.

<Piston Accommodating Hole 60>

The body 51 includes a piston accommodating hole 60. A first end of the piston accommodating hole 60 opens in the connecting surface 51*c* of the body 51. A second end of the piston accommodating hole 60 is connected to the secondary-side passage 53. The axis of the piston accommodating hole 60 agrees with the axis of the pressure reducing valve hole 54.

<Pressure Reducing Piston 61>

Each pressure reducing valve 50 includes a pressure reducing piston 61. The pressure reducing piston 61 is accommodated in the piston accommodating hole 60. The pressure reducing piston 61 reciprocates in the piston accommodating hole 60. The pressure reducing piston 61 includes a piston body 62 and a piston shaft 63. The piston shaft 63 protrudes from an end face of the piston body 62 that faces the secondary-side passage 53. The distal end of the piston shaft 63 passes through the inside of the pressure reducing valve hole 54 and is in contact with the pressure reducing valve member 56. The pressure reducing piston 61 reciprocates integrally with the pressure reducing valve member 56 in a state in which the distal end of the piston shaft 63 is in contact with the pressure reducing valve member 56. The end face of the piston body 62 that faces the secondary-side passage 53 is as a pressure receiving surface 61*a*, which receives the pressure in the secondary-side passage 53. Therefore, the pressure reducing piston 61 receives the pressure in the secondary-side passage 53 and reciprocates integrally with the pressure reducing valve member 56. A packing 64 provides a seal between the piston body 62 and the piston accommodating hole 60.

<Case 65>

Each pressure reducing valve 50 includes a case 65. The case 65 is cylindrical. The case 65 is attached to the connecting surface 51*c* with bolts 66. The interior of the case 65 and the piston accommodating hole 60 are connected to each other. The case 65 is attached to the connecting surface 51*c* of the body 51 with the axis of the case 65 agreeing with the axis of the piston accommodating hole 60.

<Nut 67 and Spring Receiving Member 68>

Each pressure reducing valve 50 includes a nut 67. The nut 67 is accommodated inside the case 65. The nut 67 is located inside the case 65 and fixed to the inner peripheral surface of the case 65. The pressure reducing valve 50 includes a spring receiving member 68. The spring receiving member 68 has the shape of a disc. The spring receiving member 68 is accommodated in the case 65. The spring receiving member 68 reciprocates inside the case 65. In the case 65, the spring receiving member 68 is arranged to be closer to the piston accommodating hole 60 than the nut 67.

<Pressure Reducing Spring 69>

Each pressure reducing valve 50 includes a pressure reducing spring 69. The pressure reducing spring 69 is accommodated inside the case 65. The pressure reducing spring 69 is disposed between the spring receiving member 68 and the pressure reducing piston 61. The pressure reducing spring 69 urges the pressure reducing piston 61 toward the pressure reducing valve member 56. When moved toward the pressure reducing valve member 56 by the urging force of the pressure reducing spring 69, the pressure reducing piston 61 presses the pressure reducing valve member 56. This moves the pressure reducing valve member 56 away from the valve seat 55. As a result, the pressure reducing valve member 56 is in the valve opening state. That is, the pressure reducing spring 69 urges the pressure reducing piston 61 in a direction in which the pressure reducing valve member 56 is brought into the valve opening state.

<Valve Shaft 70>

Each pressure reducing valve 50 includes a valve shaft 70. Inside the case 65, the valve shaft 70 is disposed farther away from the pressure reducing piston 61 than the spring receiving member 68. The valve shaft 70 includes an external thread portion 71 and a locking portion 72. The external thread portion 71 can be threaded into the nut 67. The distal end of the external thread portion 71 is in contact with the spring receiving member 68. The locking portion 72, for example, has the shape of a quadrangular prism. The locking portion 72 protrudes from an end of the external thread portion 71 at a side opposite to the spring receiving member 68.

<Pressure Reducing Knob 73>

The pressure reducing valves 50 includes a pressure reducing knob 73. The pressure reducing knob 73 includes an operation portion 74 and a receiving portion 75. The operation portion 74 includes an end portion 74*a* and a tubular portion 74*b*. The end portion 74*a* has the shape of a disc. The end portion 74*a* closes an opening of the case 65 that is on a side opposite to the connecting surface 51*c*. The tubular portion 74*b* covers an end portion of the outer peripheral surface of the case 65 on a side opposite to the connecting surface 51*c*.

The receiving portion 75 has a tubular shape. The receiving portion 75 projects from the inner surface of the end portion 74*a*. The receiving portion 75 includes an insertion hole 75*a*. The insertion hole 75*a*, for example, has a rectangular shape. The locking portion 72 is locked to the receiving portion 75 by being inserted into the insertion hole 75*a*.

The pressure reducing knob 73 is rotational relative to the case 65. When the pressure reducing knob 73 rotates relative to the case 65, the valve shaft 70 rotates integrally with the pressure reducing knob 73 since the locking portion 72 is locked to the receiving portion 75.

At this time, the external thread portion 71 is threaded into the nut 67. When the pressure reducing knob 73 is rotated in the forward direction, for example, the valve shaft 70 is threaded forward with respect to the nut 67. When the valve shaft 70 is threaded forward with respect to the nut 67 to push the spring receiving member 68, the spring receiving member 68 moves toward the pressure reducing piston 61. This reduces the distance between the spring receiving member 68 and the pressure reducing piston 61, so that the pressure reducing spring 69 is compressed to increase the spring force of the pressure reducing spring 69.

When the pressure reducing knob 73 is rotated in the opposite direction, for example, the valve shaft 70 is threaded backward with respect to the nut 67. Accordingly, the pressure reducing spring 69 extends, so that the spring receiving member 68 moves away from the pressure reducing piston 61. This increases the distance between the spring receiving member 68 and the pressure reducing piston 61, so that the pressure reducing spring 69 is extended to reduce the spring force of the pressure reducing spring 69.

As described above, the spring force of the pressure reducing spring 69 is adjusted so as to adjust the urging force of the pressure reducing spring 69, which urges the pressure reducing piston 61 in the direction in which the pressure reducing valve member 56 is brought into the valve opening state. The pressure reducing knob 73 is thus operated to adjust the urging force of the pressure reducing spring 69. The pressure reducing knob 73 is configured to be switched between a rotatable position, at which the pressure reducing knob 73 is rotatable with respect to the case 65, and a non-rotatable position, at which the pressure reducing knob 73 is not rotatable with respect to the case 65.

<Pressure Gauge 80>

The electromagnetic valve manifold 10 includes a pressure gauge 80. The pressure gauge 80 detects the pressure in the secondary-side passage 53. The pressure gauge 80 is located on the connecting surface 51*c* of the body 51. That is, the pressure gauge 80, which detects the pressure in the secondary-side passage 53, is provided on the connecting surface 51*c*. The body 51 includes a mounting hole 81, to which the pressure gauge 80 is attached. A first end of the mounting hole 81 opens in the connecting surface 51*c*. A second end of the mounting hole 81 is connected to the secondary-side passage 53. The pressure gauge 80 includes a sensor portion that is exposed to the secondary-side passage 53 through the mounting hole 81. A part of the pressure gauge 80 projects to the outside from the mounting hole 81. That is, the pressure gauge 80 projects from the connecting surface 51*c*.

Figure 4:
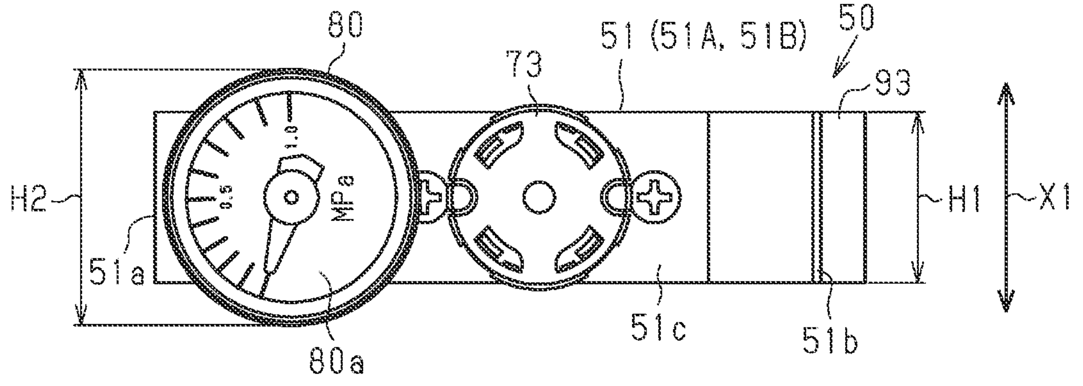
FIG. 4 is a plan view of the pressure reducing valve shown in FIG. 3.

As shown in FIG. 4, the pressure gauge 80 includes a display 80*a*. The display 80*a* displays the pressure in the secondary-side passage 53. The display 80*a* of the pressure gauge 80 protrudes from the body 51 in the width direction of the body 51. Thus, the width H1 of the body 51 is smaller than the size H2 in the width direction of the body 51 of the pressure gauge 80. The pressure gauge 80 protrudes from the connecting surface 51*c* in a state of being offset toward the first surface 51*a* with respect to the center in the longitudinal direction of the connecting surface 51*c*. In plan view from a position facing the connecting surface 51*c*, the pressure gauge 80 is disposed on the connecting surface 51*c* in a state of being adjacent to the pressure reducing knob 73 in the longitudinal direction of the body 51. Thus, in plan view from a position facing the connecting surface 51*c*, the pressure reducing knob 73 is disposed on the connecting surface 51*c* in a state of being adjacent to the pressure gauge 80 in the longitudinal direction of the body 51.

<First Gasket 91 and Second Gasket 92>

Figure 5:
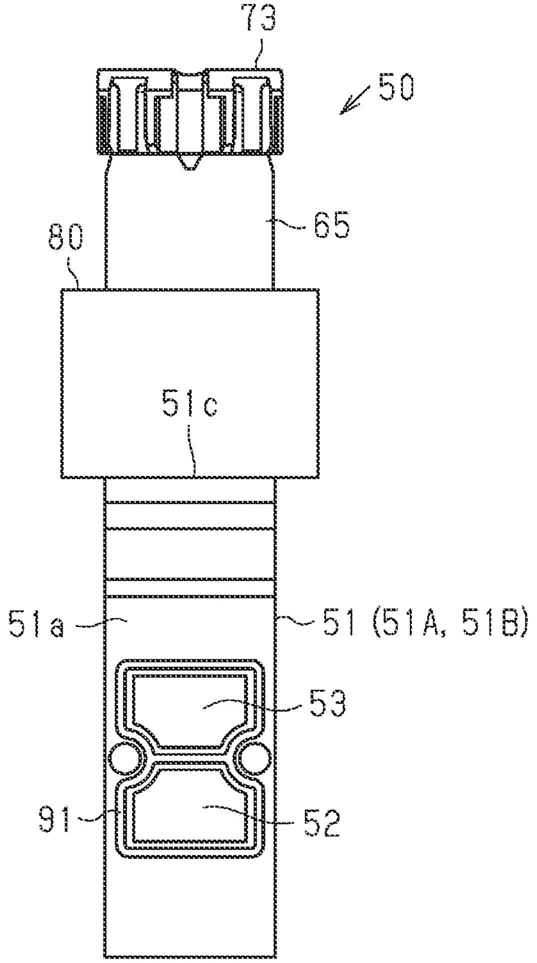
FIG. 5 is a front view of the pressure reducing valve shown in FIG. 3, as seen from the side corresponding to a first surface of a body.
Figure 6:
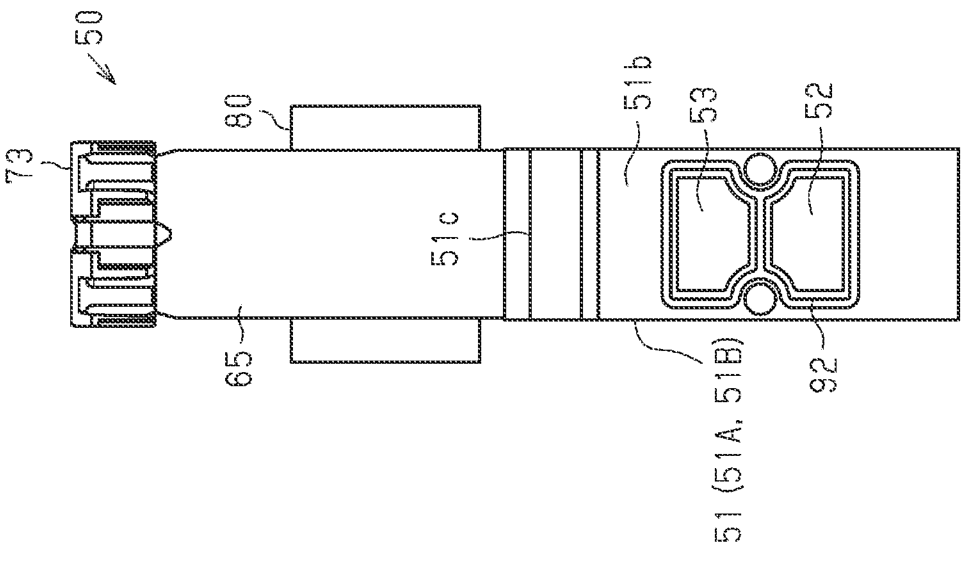
FIG. 6 is a front view of the pressure reducing valve shown in FIG. 3, as seen from the side corresponding to a second surface of a body.

As shown in FIGS. 5 and 6, the electromagnetic valve manifold 10 includes first gaskets 91 and second gaskets 92. Each first gasket 91 is attached to the first surface 51*a*. The first gasket 91 provides a seal between the first opening of the primary-side passage 52 and the first opening of the secondary-side passage 53. Each second gasket 92 is attached to the second surface 51*b*. The second gasket 92 provides a seal between the second opening of the primary-side passage 52 and the second opening of the secondary-side passage 53. The first gasket 91 and the second gasket 92 have the same shape.

<First Body 51A and Second Body 51B>

As shown in FIG. 2, the bodies 51 include first bodies 51A and second bodies 51B. The first surface 51*a* of each first body 51A is attached to the attachment surface 41 of the corresponding spacer 40. The primary-side passage 52 of the first body 51A is connected to the first supply connecting passage 42 through the first opening in the first surface 51*a*. The secondary-side passage 53 of the first body 51A is connected to the second supply connecting passage 43 through the first opening in the first surface 51*a*. A sealing member 93 is attached to the second surface 51*b* of the first body 51A. The sealing member 93 that is attached to the second surface 51*b* of the first body 51A blocks the primary-side passage 52 and the secondary-side passage 53 that open in the second surface 51*b* of the first body 51A.

The second surface 51*b* of each second body 51B is attached to the attachment surface 41 of the spacer 40 different from the spacer 40 to which the first body 51A is attached. The primary-side passage 52 of the second body 51B is connected to the first supply connecting passage 42 through the second opening in the second surface 51*b*. The secondary-side passage 53 of the second body 51B is connected to the second supply connecting passage 43 through an opening in the second surface 51*b*. A sealing member 93 is attached to the first surface 51*a* of the second body 51B. The sealing member 93 that is attached to the first surface 51*a* of the second body 51B blocks the primary-side passage 52 and the secondary-side passage 53 that open in the first surface 51*a* of the second body 51B.

The first bodies 51A and the second bodies 51B are arranged alternately in the arrangement direction of the electromagnetic valves 11. The pressure gauges 80 provided on the first bodies 51A and the pressure gauges 80 provided on the second bodies 51B are in a staggered arrangement in plan view from a position facing the connecting surface 51*c*. Also, the pressure reducing knobs 73 provided on the first bodies 51A and the pressure reducing knobs 73 provided on the second bodies 51B are in a staggered arrangement in plan view from a position facing the connecting surface 51*c*.

<Operation>

Operation of the present embodiment will now be described.

Figure 7:
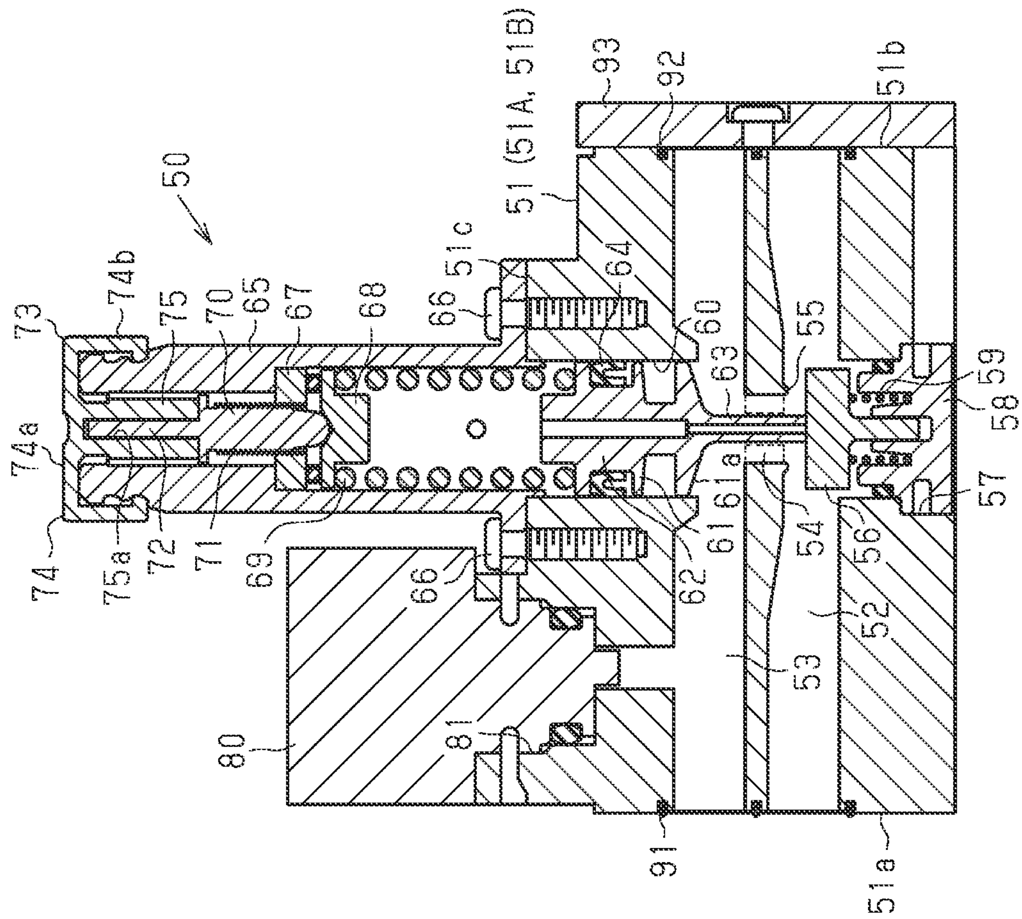
FIG. 7 is a cross-sectional view showing a pressure reducing valve member of the pressure reducing valve shown in FIG. 3 in a valve opening state.

As shown in FIG. 7, when the pressure in the secondary-side passage 53 falls below the preset pressure, the pressure reducing spring 69 pushes the pressure reducing piston 61 against the pressure in the secondary-side passage 53, which acts on the pressure receiving surface 61*a* of the pressure reducing piston 61. This moves the pressure reducing valve member 56 away from the valve seat 55. As a result, the pressure reducing valve member 56 is in the valve opening state. When the pressure reducing valve member 56 is in the valve opening state, the pressure fluid from the supply passage 31 is supplied to the supply port P via the first supply connecting passage 42, the primary-side passage 52, the pressure reducing valve hole 54, and the secondary-side passage 53. The supply passage 31 thus supplies the pressure fluid to the supply port P.

When the pressure fluid flows from the primary-side passage 52 to the secondary-side passage 53 via the pressure reducing valve hole 54, the pressure in the secondary-side passage 53 increases. Then, when the pressure acting on the pressure receiving surface 61*a* of the pressure reducing piston 61 increases, the pressure reducing piston 61 moves toward the spring receiving member 68. Further, the urging force of the return spring 59 moves the pressure reducing valve member 56 toward the valve seat 55. When the pressure in the secondary-side passage 53 reaches the preset pressure, the pressure reducing valve member 56 is seated on the valve seat 55 to be in the valve closing state. Accordingly, the pressure in the secondary-side passage 53 becomes the preset pressure.

When the spool valve 17 is at the first position, the pressure fluid supplied to the supply port P flows to the fluid pressure device via the first output port A, the first output connecting passage 44, and the first output passage 32. Then, the pressure fluid from the fluid pressure device is discharged to the outside via the second output passage 33, the second output connecting passage 45, the second output port B, the second discharge port R2, the second discharge connecting passage 47, and the second discharge passage 35.

When the spool valve 17 is at the second position, the pressure fluid supplied to the supply port P flows to the fluid pressure device via the second output port B, the second output connecting passage 45, and the second output passage 33. Then, the pressure fluid from the fluid pressure device is discharged to the outside via the first output passage 32, the first output connecting passage 44, the first output port A, the first discharge port R1, the first discharge connecting passage 46, and the first discharge passage 34.

The pressure of the pressure fluid that flows out from the electromagnetic valve 11 is adjusted so as to be reduced to the preset pressure by the pressure reducing valve 50. In this manner, the pressure reducing valve 50 reduces the pressure of the pressure fluid that flows out from the electromagnetic valve 11 to the preset pressure.

An operator operates the pressure reducing knob 73 to adjust the spring force of the pressure reducing spring 69 such that the pressure reducing valve member 56 is brought into the valve closing state when the pressure in the secondary-side passage 53 is the preset pressure. Specifically, the operator adjusts the spring force of the pressure reducing spring 69 by operating the pressure reducing knob 73 while checking the pressure detected by the pressure gauge 80. In this manner, the pressure reducing valve 50 reduces the pressure of the pressure fluid that flows out from the electromagnetic valve 11 by reducing the pressure in the secondary-side passage 53 such that the pressure detected by the pressure gauge 80 becomes the preset pressure.

<Advantages>

The above-described embodiment has the following advantages.

(1) The first bodies 51A and the second bodies 51B are arranged alternately in the arrangement direction of the electromagnetic valves 11. With this configuration, even if each pressure gauge 80 protrudes from the body 51 in the width direction of the body 51, the pressure gauges 80 adjacent to each other in the arrangement direction of the electromagnetic valves 11 do not interfere with each other. Therefore, even if the width H1 of the body 51 is made smaller than the size H2 in the width direction of the body 51 of the pressure gauge 80, multiple bodies 51 can be arranged side by side in the arrangement direction of the electromagnetic valves 11. Also, multiple bodies 51 can be arranged side by side in the arrangement direction of the electromagnetic valves 11 without reducing the size of the pressure gauge 80. Specifically, even if the display 80*a* of the pressure gauge 80 protrudes from the body 51 in the width direction of the body 51, multiple bodies 51 can be arranged side by side in the arrangement direction of the electromagnetic valves 11. Since the size of the pressure gauge 80 does not need to be reduced, the visibility of the pressure gauge 80 is improved. This configuration thus allows the size of the electromagnetic valve manifold 10 to be reduced, while improving the visibility of the pressure gauge 80.

(2) The first gasket 91 and the second gasket 92 have the same shape. With this configuration, since the first gasket 91 and the second gasket 92 can be identical members, the configuration of the electromagnetic valve manifold 10 is simplified.

(3) The pressure reducing knob 73 is disposed on the connecting surface 51*c* in a state of being adjacent to the pressure gauge 80 in the longitudinal direction of the body 51. The operator can therefore easily operate the pressure reducing knob 73, while checking the pressure gauge 80. This improves the ease of operation.

(4) Since the first body 51A and the second body 51B have the same configuration, costs are reduced as compared to a case in which the first body 51A and the second body 51B have different configurations.

<Modifications>

The above-described embodiment may be modified as follows. The above-described embodiment and the following modifications can be combined as long as the combined modifications remain technically consistent with each other.

In the above-described embodiment, the first gasket 91 and the second gasket 92 may have different shapes. That is, the shape of the first gasket 91 is not particularly limited as long as the first gasket 91 provides a seal between the first opening of the primary-side passage 52 and the first opening of the secondary-side passage 53. Also, the shape of the second gasket 92 is not particularly limited as long as the second gasket 92 provides a seal between the second opening of the primary-side passage 52 and the second opening of the secondary-side passage 53.

In the above-described embodiment, for example, the pressure reducing valve 50 may be configured such that the pressure reducing knob 73 is disposed on a surface of the body 51 on the side opposite to the connecting surface 51*c*. That is, the configuration of the pressure reducing valve 50 is not limited to the one in which the pressure reducing knob 73 is disposed on the connecting surface 51*c* in a state of being adjacent to the pressure gauge 80 in the longitudinal direction of the body 51.

In the above-described embodiment, the electromagnetic valve 11 is a double-solenoid electromagnetic pilot valve. However, the electromagnetic valve 11 is not limited to this, and may be, for example, a single-solenoid electromagnetic pilot valve, which includes a single pilot valve.

In the above-described embodiment, the electromagnetic valve 11 may be a four-port electromagnetic valve from which, for example, the second discharge port R2 is omitted. That is, any type of electromagnetic valve may be used as the electromagnetic valve 11 as long as the electromagnetic valve 11 includes at least one discharge port. Also, the electromagnetic valve 11 may be a three-port electromagnetic valve that includes a supply port, an output port, and a discharge port.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve manifold, comprising:

electromagnetic valves arranged side by side in one direction, each electromagnetic valve including a supply port;

manifold bases each including a supply passage, the supply passage being configured to supply a pressure fluid to the supply port;

spacers, each spacer being displaced between one of the manifold bases and one of the electromagnetic valves; and pressure reducing valves each including a body that has a shape of an elongated rectangular block, each pressure reducing valve being configured to reduce a pressure of the pressure fluid that flows out from one of the electromagnetic valves, wherein the manifold bases, the spacers, and the bodies are arranged side by side in an arrangement direction of the electromagnetic valves in correspondence with the electromagnetic valves, a width direction of each body agrees with the arrangement direction of the electromagnetic valves, each spacer includes:

an attachment surface to which the body is attached;

a first supply connecting passage that includes a first end connected to the supply passage and a second end that opens in the attachment surface; and a second supply connecting passage that includes a first end connected to the supply port and a second end that opens in the attachment surface, each body includes:

a primary-side passage that is connected to the first supply connecting passage;

a secondary-side passage that is connected to the second supply connecting passage;

a first surface that is located at a first end in a longitudinal direction of the body;

a second surface that is located at a second end in the longitudinal direction of the body; and a connecting surface that connects the first surface and the second surface to each other, and extends in the longitudinal direction and the width direction, a pressure gauge is provided on the connecting surface, the pressure gauge being configured to detect a pressure in the secondary-side passage, a width of the body is smaller than a size in the width direction of the pressure gauge, the pressure reducing valve is configured to reduce the pressure of the pressure fluid that flows out from the electromagnetic valve by reducing the pressure in the secondary-side passage such that the pressure detected by the pressure gauge becomes the preset pressure, each of the primary-side passage and the secondary-side passage extends in the longitudinal direction through the body, and includes a first opening and a second opening that respectively open in the first surface and the second surface, the pressure gauge protrudes from the connecting surface in a state of being offset toward the first surface with respect to a center in the longitudinal direction of the connecting surface, the bodies include:

one or more first bodies, the first surface of each first body being attached to the attachment surface; and one or more second bodies, the second surface of each second body being attached to the attachment surface of one of the spacers different from the spacer to which the first body is attached, and the first bodies and the second bodies are arranged alternately in the arrangement direction.

2. The electromagnetic valve manifold according to claim 1, further comprising:

a first gasket that is attached to the first surface and is configured to provide a seal between the first opening of the primary-side passage and the first opening of the secondary-side passage; and a second gasket that is attached to the second surface and is configured to provide a seal between the second opening of the primary-side passage and the second opening of the secondary-side passage, wherein the first gasket and the second gasket have a same shape.

3. The electromagnetic valve manifold according to claim 1, wherein each pressure reducing valve includes:

a pressure reducing valve hole that connects the primary-side passage and the secondary-side passage to each other;

a pressure reducing valve member that is configured to selectively open and close the pressure reducing valve hole;

a pressure reducing piston that is configured to receive the pressure in the secondary-side passage and reciprocate integrally with the pressure reducing valve member;

a pressure reducing spring that is configured to urge the pressure reducing piston in a direction in which the pressure reducing valve member is brought into a valve opening state; and a pressure reducing knob that is configured to be operated to adjust an urging force of the pressure reducing spring, and the pressure reducing knob is disposed on the connecting surface in a state of being adjacent to the pressure gauge in the longitudinal direction.

* * * * *